(12) United States Patent
Sadi-Haddad et al.

(10) Patent No.: US 12,535,129 B2
(45) Date of Patent: Jan. 27, 2026

(54) TRANSMISSION BELT

(71) Applicants: AKTIEBOLAGET SKF, Gothenburg (SE); SKF MAGNETIC MECHATRONICS, Saint-Marcel (FR)

(72) Inventors: Lakdar Sadi-Haddad, Nogent sur Marne (FR); Josue Saury, Saint-Marcel (FR); Lloyd Brown, Singapore (SG); David Beggs, Antipolo (PH)

(73) Assignees: AKTIEBOLAGET SKF, Gothenburg (SE); SKF MAGNETIC MECHATRONICS, Saint-Marcel (FR)

( * ) Notice: Subject to any disclaimer, the term of this patent is extended or adjusted under 35 U.S.C. 154(b) by 62 days.

(21) Appl. No.: 18/468,951

(22) Filed: Sep. 18, 2023

(65) Prior Publication Data

US 2024/0110617 A1  Apr. 4, 2024

(30) Foreign Application Priority Data

Oct. 4, 2022 (DE) .......................... 102022210494.3

(51) Int. Cl.
 *F16H 57/01* (2012.01)
 *G01N 21/88* (2006.01)
 *F16H 7/02* (2006.01)
(52) U.S. Cl.
 CPC ......... *F16H 57/01* (2013.01); *G01N 21/8851* (2013.01); *F16H 7/02* (2013.01)
(58) Field of Classification Search
 CPC ....................................................... F16H 57/01
 See application file for complete search history.

(56) References Cited

U.S. PATENT DOCUMENTS

| 4,268,573 A | 5/1981 | Baillievier |
| 6,825,758 B1 | 11/2004 | Laitsaari |

(Continued)

FOREIGN PATENT DOCUMENTS

| DE | 102009003732 A1 * | 10/2010 | .............. F16G 1/00 |
| EP | 3919775 A1 | 12/2021 | |

(Continued)

OTHER PUBLICATIONS

Luo, Chengyang, et al. "Wearable Textile UHF-RFID Sensors: A Systematic Review," Department of Electronic Engineering, Universitat Politecnica de Catalunya, 08222 Barcelona, Spain; pp. 1-18, Jul. 24, 2020.

(Continued)

*Primary Examiner* — Travis R Hunnings
(74) *Attorney, Agent, or Firm* — J-TEK LAW PLLC; Scott T. Wakeman; Mark A. Ussai

(57) ABSTRACT

A transmission belt includes a belt member, and at least one sensor attached to the belt member that is configured to measure a parameter indicative of a state of the transmission belt. A transmitter is attached to the belt member and configured to transmit a signal indicative of the state of the transmission belt to a receiver. The transmission belt includes a power system configured to provide power to the at least one sensor and/or the transmitter, and the power system includes a power source and an energy converter. The energy converter is configured to receive energy, convert the received energy to electrical energy and provide the electrical energy to the power source.

11 Claims, 6 Drawing Sheets

(56) References Cited

U.S. PATENT DOCUMENTS

| | | |
|---|---|---|
| 10,408,344 B2 | 9/2019 | Ma et al. |
| 12,165,490 B2 | 12/2024 | Sadi-Haddad et al. |
| 2003/0080918 A1 | 5/2003 | Forster et al. |
| 2013/0005533 A1* | 1/2013 | Al .................. A63B 21/0055 |
| | | 482/2 |
| 2017/0254405 A1* | 9/2017 | Ballhausen ............... F16G 1/10 |
| 2018/0119790 A1* | 5/2018 | Kanduri .................. F16H 57/01 |
| 2018/0128352 A1* | 5/2018 | Scholzen ................. F16H 7/02 |
| 2021/0348974 A1* | 11/2021 | Sekiguchi ............... H02P 21/13 |
| 2022/0128120 A1 | 4/2022 | Hayashi et al. |
| 2023/0115742 A1 | 4/2023 | Sadi-Haddad et al. |

FOREIGN PATENT DOCUMENTS

| | | |
|---|---|---|
| JP | 2020006930 A | 1/2020 |
| JP | 2020118297 A | 8/2020 |
| WO | 2020158696 A1 | 8/2020 |

OTHER PUBLICATIONS

Yu, Mengxia, et al., "Passive Embroidered Stretch Sensor Utilizing UHF RFID Antennas," 2019 IEEE SmartWorld, Ubiquitous Intelligence & Computing, Advanced & Trusted Computing, Scalable Computing & Communications, Cloud & Big Data Computing, Internet of People and Smart City Innovation, pp. 497-501, IEEE, Aug. 2019.

* cited by examiner

TRANSMISSION BELT

CROSS-REFERENCE

This application claims priority to German patent application no. 10 2022 210 494.3 filed on Oct. 4, 2023, the contents of which are fully incorporated herein by reference.

TECHNOLOGICAL FIELD

The present disclosure is directed to a transmission belt, a condition monitoring arrangement for monitoring a state of a transmission belt, a method for issuing a signal indicative of a state of a transmission belt and a method for monitoring a condition of a transmission belt.

BACKGROUND

Transmission belts are well-known components for transmitting power between two rotatable shafts in a machine. Improper belt tension can quickly damage or destroy the belt by overheating caused by slippage (too low tension) or damage bearings supporting the rotatable shafts due to overload applied to the shafts (too high tension). To ensure trouble-free operation and to benefit from all the properties of a transmission belt, special attention must be paid to the initial installation. Once belts are in operation, they are normally no longer monitored although they deteriorate over time. Based on for instance environmental conditions and other factors such as how the machinery is operated, the belt can deteriorate faster than expected, which will deteriorate the efficiency and potentially cause irreversible damage to the system in which the belt is used. A way of monitoring a condition of the belt after initial installation is to provide the transmission belt with battery powered sensors for sensing and collecting data regarding a condition of the transmission belt. The data can then be read and analyzed.

However, batteries have a limited capacity for storing energy which is unlikely to be enough for the life expectancy of the transmission, thereby hindering the collection of data regarding the condition of the belt. Further, replacing a spent battery requires the transmission belt to be stopped, thus stopping the machinery where the transmission belt operates.

SUMMARY

In view of the above, a first aspect of the disclosure is to provide an improved transmission belt which to at least some extent overcomes at least some of the issues with the prior art. A further aspect of the disclosure is to provide an improved condition monitoring arrangement for monitoring a state of a transmission belt. Yet a further aspect is to provide a method for issuing a signal indicative of a state of a transmission belt. Another aspect is to provide an improved method for condition monitoring of a transmission belt.

A first aspect of the disclosure is a transmission belt that includes a belt member and at least one sensor attached to the belt member for measuring a parameter indicative of a state of the transmission belt. A transmitter is attached to the belt member for transmitting a signal indicative of the state of the transmission belt, and a power system provides power to the at least one sensor and/or the transmitter. The power system includes a power source and an energy converter, and the energy converter is configured to receive energy, convert the received energy to electrical energy and supply the electrical energy to the power source.

By provision of the transmission belt as disclosed herein, an improved transmission belt is provided, for which a parameter indicative of a state of the transmission belt is measured by at least one sensor, and a signal indicative of the state of the transmission belt is transmitted by transmitter. In particular, it has been realized that by using a power system attached to the transmission belt, which power system comprises a power source and an energy converter, the power system may provide electrical power to the at least one sensor and/or transmitter. Thereby, as the power system provides electrical power to the at least one sensor and/or transmitter, a more robust and reliable transmission belt is achieved in a cost-effective manner.

The present disclosure also provides a better performing transmission belt, because the power system enables electrical power to be provided to the at least one sensor and/or transmitter. Furthermore, because the converter provides electrical energy to the power source, there will be no need to change the power source, thereby providing for a more efficient functioning of the transmission belt. Consequently, the machinery in which the transmission belt is applied is naturally also better operated.

A "state" of the transmission belt as used herein is meant any physical parameter possible to measure by interpreting the current fluctuation of the antenna. These physical parameters may be, but are not limited to, for instance force, temperature, strain, acceleration, elongation, pressure and/or humidity. These parameters are all relevant to either monitor the condition of the belt or the environment in which the belt is operating. The parameters may also be used to monitor the operation of the machine in which the belt is being used. These are all things that ultimately affect the condition and service life of the transmission belt.

The belt may be made at least partly from rubber. It may also be made from any other suitable material, or any combinations of suitable materials, for providing the desired characteristics of the belt in question. The materials in the combination of materials may include metal wires to provide strength and/or parts made from fabric or textiles. The belt may comprise any other material or combinations of suitable materials.

The at least one sensor may be attached to the transmission belt, for instance, by gluing it to the transmission belt. It may also be embedded in the transmission belt, such as e.g., by being molded into a rubber portion of the belt. The at least one sensor may also be attached to an intermediate attachment member for being attached to the belt to provide for a more firm and rigid attachment to the transmission belt. The same is applicable also for the transmitter and power system comprising the power source and converter.

Optionally, the transmitter and the at least one sensor are combined such that the at least one sensor is also the transmitter. Alternatively, the at least one sensor and the transmitter are connected. The transmitter receives the measured parameter from the at least one sensor before transmitting the signal.

The at least one sensor may be any type of suitable sensor. The at least one sensor may often comprise an integrated circuit (IC) chip. In some examples, the at least one sensor may be an RFID tag. "RFID tag" as used herein means a Radio Frequency Identification (RFID) tag. RFID tags may often comprise an antenna and an IC, such as a radio frequency integrated circuit chip (RFIC). In some examples, the at least one sensor may by a temperature sensor, an elongation sensor, an accelerometer, an optical sensor, an acoustic sensor, an inductive sensor, a magnetic sensor, and/or a sensor for measuring a speed, position and/or displacement of the transmission belt.

When the at least one sensor is an RFID tag, the RFID tag may comprise an antenna. The antenna may be used to measure the parameter indicative of the state of the transmission belt, e.g., based on a current deflection of the antenna.

By "a current deflection" of the antenna as used herein is meant any present shape of the antenna. The deflection may be a normative deflection, i.e., a shape corresponding to an expected shape as when the transmission belt is installed and/or operated. The current deflection may also be for instance in a lengthwise compressed or elongated deflection compared with the normative deflection, in which case it may indicate an elongation, acceleration, force and/or strain in the transmission belt. The current deflection may also be in a radially expanded or radially compressed shape, such that the area of a cross section of the wire is increased or decreased. This may indicate a temperature increase or decrease of the transmission belt. As the antenna is stretched or compressed in different ways, the signal it transmits will have different frequencies and wavelengths corresponding to different states. This signal is referred to as an RFID signal and corresponds the measured parameter indicative of the state of the transmission belt. These RFID signals are transmitted, or provided, to the transmitter which transmits the signal indicative of the state of the transmission belt. The signal can then be picked up by a receiver and compared with a predetermined first criterion. Alternatively, the RFID tag transmits the signal directly to the receiver, e.g., when the at least one sensor, such as the RFID tag, and the transmitter is combined, that is, the at least one sensor also comprises the transmitter. Thereby, the current signal indicative of a state of the belt can be compared and reveal what state the transmission belt is in, such as if it is in an elongated state.

When the at least one sensor is a temperature sensor, the sensor may measure the temperature of the transmission belt. Thus, the temperature may be the parameter indicative of the state of the transmission belt. The temperature of the transmission belt may e.g., be indicative the slip of the transmission belt, which may in turn be indicative of an elongation of the transmission belt. A higher temperature may e.g., be indicative a higher degree of slip of the transmission belt compared to a lower temperature. This is because the slipping transmission belt creates friction between the transmission belt and the rotatable shafts on which the transmission belt in mounted, which generates heat that increases the temperature of the transmission belt. Correspondingly, a higher degree of slip of the transmission belt may be indicative of a greater elongation of the transmission belt compared to a lower degree of slip. This since an elongated transmission belt results in reduced tension in the transmission belt, which results in an increased slip of the transmission belt.

When the at least one sensor is an accelerometer, the at least one sensor may measure an acceleration and/or deceleration of the transmission belt. Thus, the acceleration and/or deceleration may be the parameter indicative of the state of the transmission belt. The acceleration and/or deceleration of the transmission belt may be indicative the slip of the transmission belt, which may in turn be indicative of an elongation of the transmission belt. This is because the unexpected acceleration and/deceleration may be caused by a slip of the transmission belt.

By "signal" as used herein is meant any of a radio frequency wave, electromagnetic wave or any other suitable technology for transmitting information regarding a state of a belt.

Optionally, the state is a state of elongation of the transmission belt. As the belt is elongated, the at least one sensor will measure the elongation, such as the parameter indicative of the state of the transmission belt. E.g., the antenna of an RFID tag will elongate together with the transmission belt. As such, the antenna will generate a different RFID signal corresponding to the elongation of the antenna and the belt. Alternatively, a sensor that is not an RFID tag may measure the elongation of the transmission belt.

Optionally, the at least one sensor is configured to communicate the measured parameter indicative of the state of the transmission belt to the transmitter.

Optionally, the energy converter is configured to receive energy, convert the received energy to electrical energy, and provide the electrical energy to the power source while the transmission belt is in operation. Thereby, the power source is charged with electrical energy without stopping the transmission belt, and there will not be needed to stop the transmission belt to change the power source.

Optionally, the transmission belt further comprises an energy harvester configured to harvest energy and provide the harvested energy to the energy converter. The energy harvester may harvest energy from the movement of the transmission belt. The energy harvester may be referred to as a kinematic energy harvester. The harvested energy, which may be kinetic energy harvested from the movement of the transmission belt, is then provided to the energy converter. Further optionally, the energy harvester is attached to the transmission belt by any of the examples as described above for the at least one sensor, the transmitter and the power system. In some embodiments, the energy converter may be integrated with the energy harvester.

Optionally, the energy converter is configured to receive the energy wirelessly from an external energy emitter, or receive energy from the energy harvester. The external energy emitter may e.g., be a high-power radio frequency signal emitter or an electromagnetic wave emitter. When transmitting the radio frequency signal or electromagnetic wave, a magnetic field is generated. The energy converter then converts this to electric energy which is provided to the power source. This may mean that electric energy is generated in the energy converter when receiving the generated magnetic field.

Optionally, the transmitter is configured to transmit the signal while the transmission belt is in operation. A benefit of transmitting the signal while the transmission belt is in operation is that the signal can be received and read without stopping the machinery. Thereby, an increased operation efficiency of the machinery can be achieved.

Optionally, the transmitter is a Bluetooth transmitter and/or a WIFI transmitter comprising an antenna configured to transmit at least part of the signal wirelessly. Optionally, more than one transmitter is attached to the belt member. Further optionally, the at least one sensor is connected to more than one transmitter, and each of the more than one transmitter transmits the signal to a respective receiver to ensure reliable reading of the signal in case any of the respective transmission of a signal would malfunction in any way. A benefit of having at least two transmissions of the signal is that the two signals can be compared, and any deviations may signal that something is wrong or about to go wrong with the belt and its components. As such, by more than one transmitter, a more reliable transmission belt is obtained.

Optionally, at least two sensors are attached to the belt member. The at least two sensors may be the same type of sensor or different types of sensors. A benefit of having at least two sensors measuring the parameter indicative of the state of the transmission belt is that the respective signals of the measured parameters can be compared, and any deviations may signal that something is wrong or about to go wrong with the belt and its components. As such, by more than one sensor, a more reliable transmission belt is obtained.

The present disclosure also relates to a condition monitoring arrangement for monitoring a state of a transmission belt. The arrangement comprises a transmission belt according to any one of the embodiments of the transmission belt, wherein the arrangement further comprises at least one receiver for receiving the signal transmitted from the transmission belt.

Optionally, the receiver is configured to read the signal transmitted by the transmitter. Thus, the receiver may be an RFID reader, a Bluetooth reader, a WIFI reader, or any other reader suitable to read signals from the transmitter. Still optionally, the receiver is also configured to power the energy harvester by sending out electromagnetic waves. Once the reader transmits electromagnetic waves to the energy harvester, the energy harvester harvest the energy, e.g., by an antenna inside the energy harvester creating an electromagnetic field, and electric energy is generated in the antenna which is provided to the energy converter. A benefit of having a reader transmitting energy to the energy harvester is that it does not require a change of the power source, e.g., battery, and thus there is no need to stop the transmission belt.

Still optionally, the condition monitoring arrangement may comprise more than one receiver for receiving signals transmitted from more than one transmitter. Further optionally, the condition monitoring arrangement may comprise more than one receiver for receiving signals from different types of transmitters.

Optionally, the condition monitoring arrangement may comprise a plurality of transmission belts. Each one of the plurality of belts may differ according to any of the embodiments as disclosed herein, or the belts may be of the same type according to any of the embodiments as disclosed herein.

The present disclosure also relates to a method for issuing a signal indicative of the state of a transmission belt. The belt may include a belt member, at least one sensor attached to the belt member for measuring a parameter indicative of a state of the transmission belt, a transmitter attached to the belt member for transmitting a signal indicative of the state of the transmission belt, and a power system attached to the belt member for providing electrical power to the at least one sensor and/or the transmitter. The power system comprises a power source and an energy converter. The energy converter is configured to receive energy, convert the received energy to electrical energy and feed the electrical energy to the power source.

The method comprises providing, from the power system, electrical power to the at least one sensor and/or transmitter, determining the state of the transmission belt on the basis of a parameter measured by the at least one sensor, and issuing the signal indicative of the state of the transmission belt.

The present disclosure also relates to a method for monitoring a condition of a transmission belt by issuing a signal according to an embodiment herein. The method comprises receiving the signal by using a receiver and comparing the signal with a predetermined first criterion. The first criterion may e.g., be a first threshold.

Optionally, the method for condition monitoring of a transmission belt further comprises issuing a notification if the signal fulfils the predetermined first criterion.

The present disclosure also relates to a transmission belt that includes a belt member and at least one sensor attached to the belt member that is configured to measure a parameter indicative of a state of the transmission belt. A transmitter is attached to the belt member and configured to transmit a signal indicative of the state of the transmission belt to a receiver. The transmission belt also includes a power system configured to provide power to the at least one sensor and/or the transmitter, and the power system includes an electrical storage device, for example, a capacitor or a rechargeable battery, electrically connected to an energy converter. The energy converter is configured to produce an electric current from kinetic energy of the belt member and/or from a radio frequency signal and to provide the electric current to the electrical storage device.

Fulfilling the predetermined criterion may mean e.g., that the signal is above or below the first threshold, e.g., depending on the type of sensor.

BRIEF DESCRIPTION OF THE DRAWINGS

The present disclosure will hereinafter be further explained by means of non-limiting examples with reference to the appended schematic figures wherein.

DETAILED DESCRIPTION

Figure 1A:
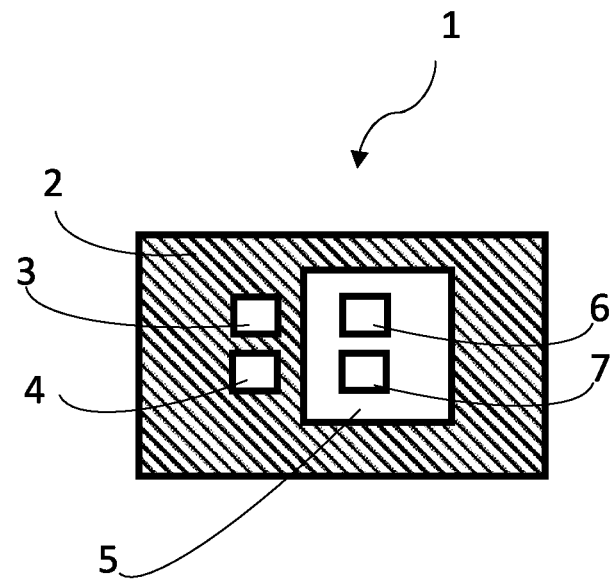
FIG. 1A is a schematic view of a transmission belt according to an embodiment of the present disclosure.

It should be noted that the drawings have not necessarily been drawn to scale and that the dimensions of certain features may have been exaggerated for the sake of clarity. Like reference signs in the drawings refer to the same or similar element, unless expressed otherwise.

FIG. 1A is a schematic view of a transmission belt 1 according to an embodiment of the present invention. The transmission belt 1 comprises a belt member 2 and at least one sensor 3 attached to the belt member 2. The at least one sensor 3 is configured to measure a parameter indicative of a state of the transmission belt 1. The transmission belt 1 further comprises a transmitter 4 attached to the belt member 2. The transmitter 4 is configured to transmit a signal indicative of the state of the transmission belt 1. Still further, the transmission belt 1 comprises a power system 5 attached to the belt member 2. The power system 5 is configured to provide electrical power to the at least one sensor 3 and/or the transmitter 4. The power system 5 comprises a power source 6 and an energy converter 7. The energy converter 7 is configured to receive energy, convert the energy to electrical energy, and feed the electrical energy to the power source 6. The at least one sensor 3 may be attached to the transmission belt 1 by gluing the at least one sensor 3 to the transmission belt 1. It may also be embedded in the transmission belt 1, such as e.g., molded into a portion made from rubber. The at least one sensor 3 may also be attached to an intermediate attachment member (not illustrated) that is attached to the belt 1 to provide for a firmer and more rigid attachment to the transmission belt 1. The same is applicable also for the transmitter 3 and power system 5 comprising the power source 6 and converter 7.

Figure 1B:
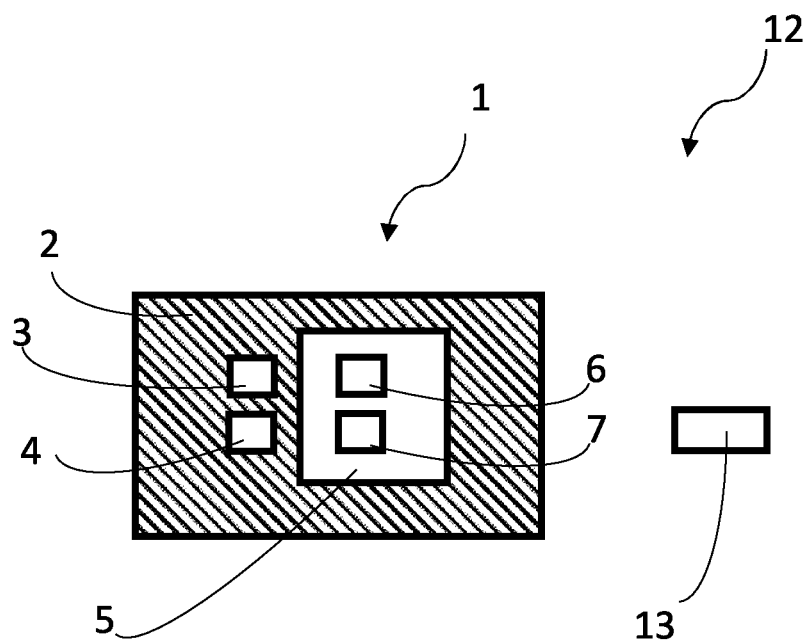
FIG. 1B is a schematic view of a system including the transmission belt and condition monitoring arrangement of FIG. 1 together with a receiver.

FIG. 1B depicts a schematic view of a transmission belt 1 and a condition monitoring arrangement 12 according to an embodiment of the present disclosure. Here, the transmission belt from FIG. 1A is shown in combination with a receiver 13 for receiving a transmitted signal indicative of a state of the transmission belt 1. The transmission of the signal may be done by a physical connection or wirelessly.

Figure 2:
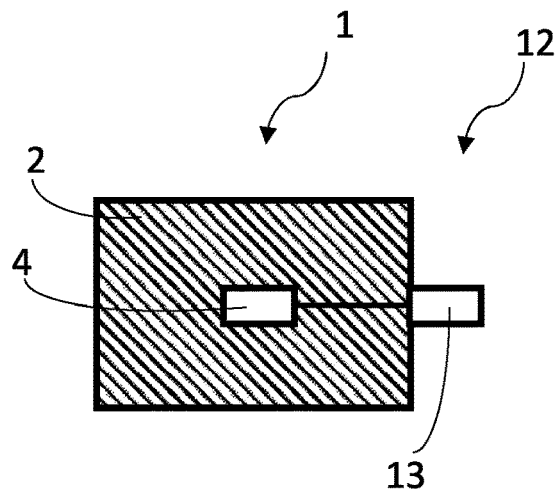
FIG. 2 is a schematic view of a transmission belt and a condition monitoring arrangement according to another embodiment of the present disclosure.

FIG. 2 depicts a schematic view of a transmission belt 1 and a condition monitoring arrangement 12 according to an embodiment of the present disclosure. Here, the receiver 13 is connecting to the transmitter 4 in a physical manner to transfer the signal or any other data. For example, a wire from the receiver 13 may be connected to a socket of the transmission belt 1 with an electrical connection to the transmitter 4. Such electrical connection to receive a signal indicative of a state of the transmission belt 1 may physically be done in any other suitable way.

Figure 3:
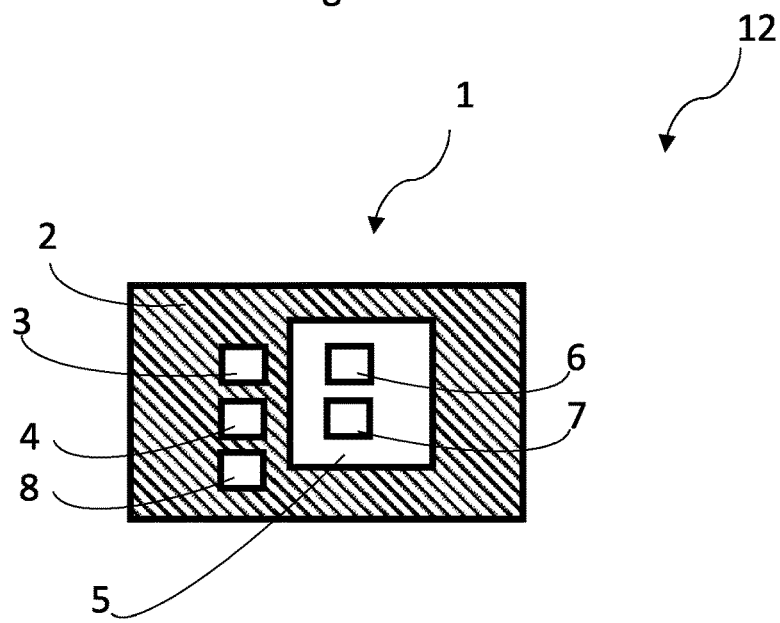
FIG. 3 is a schematic view of a transmission belt and a condition monitoring arrangement according to another embodiment of the present disclosure.

FIG. 3 depicts a schematic view of a transmission belt 1 and a condition monitoring arrangement 12 according to an embodiment of the present disclosure. Here, the transmission belt 1 can be seen further comprising an energy harvester 8 configured to harvest energy and provide the harvested energy to the energy converter 7. The energy harvester 7 may optionally be a kinematic energy harvester. The energy harvester 8 may be attached to the transmission belt 1 by any of the examples as described above for the at least one sensor 3, the transmitter 4 and the power system 5.

Figure 4:
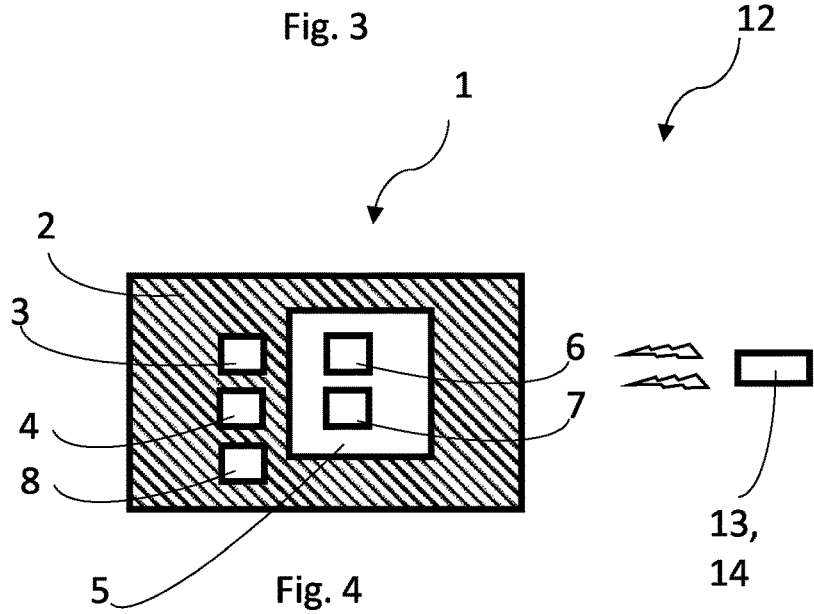
FIG. 4 is a schematic view of a transmission belt and a condition monitoring arrangement according to another embodiment of the present disclosure.

FIG. 4 depicts a schematic view of a transmission belt 1 and a condition monitoring arrangement 12 according to an embodiment of the present disclosure. Here, the transmission belt 1 can be seen further comprising an energy harvester 8 configured to harvest energy and provide the harvested energy to the energy converter 7. The energy harvester 7 may optionally receive energy wirelessly from an external energy emitter 14. Optionally, the energy emitter 14 is the receiver 13.

Figure 5:
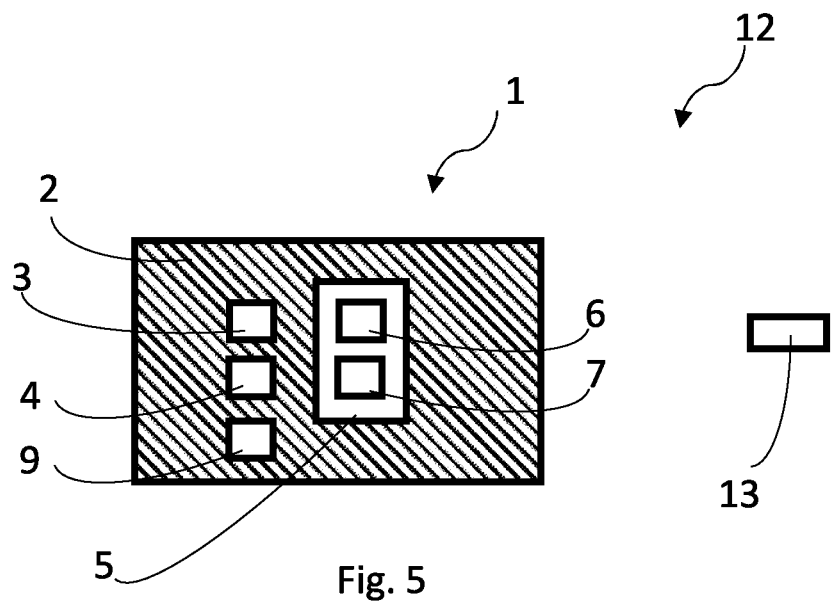
FIG. 5 is a schematic view of a transmission belt and a condition monitoring arrangement according to another embodiment of the present disclosure.

FIG. 5 depicts a schematic view of a transmission belt 1 and a condition monitoring arrangement 12 according to an embodiment of the present disclosure. Here, the transmission belt 1 of FIG. 1B can be seen complemented with a separate integrated circuit 9. The integrated circuit 9 may be used for storing signal data in case the signal would not be able to be transmitted and/or received at some point. Then the signal and its related data may be stored and transmitted later upon a successful connection between the transmitter 4 and the receiver 13.

Figure 6:
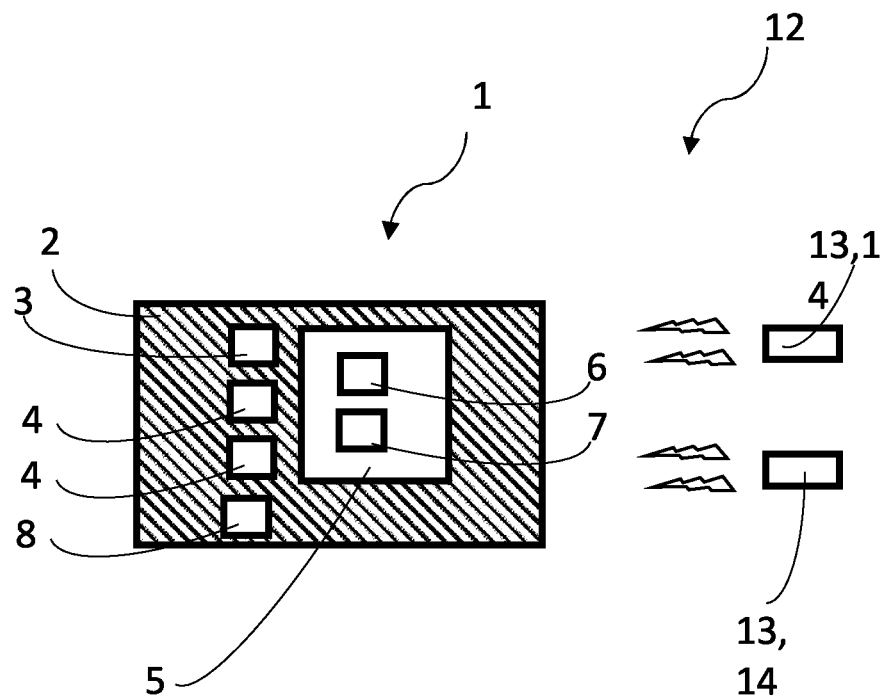
FIG. 6 is a schematic view of a transmission belt and a condition monitoring arrangement according to another embodiment of the present disclosure.

FIG. 6 depicts a schematic view of a transmission belt 1 and a condition monitoring arrangement 12 according to an embodiment of the present disclosure. Here, the transmission belt 1 can be seen comprising two transmitters 4. Further, two receivers 13, which may also be configured to operate as energy emitters 14, can be seen for receiving the signal indicative of the state of the transmission belt 1, and optionally be used by the energy harvester 8 to receive energy wirelessly.

Figure 7:
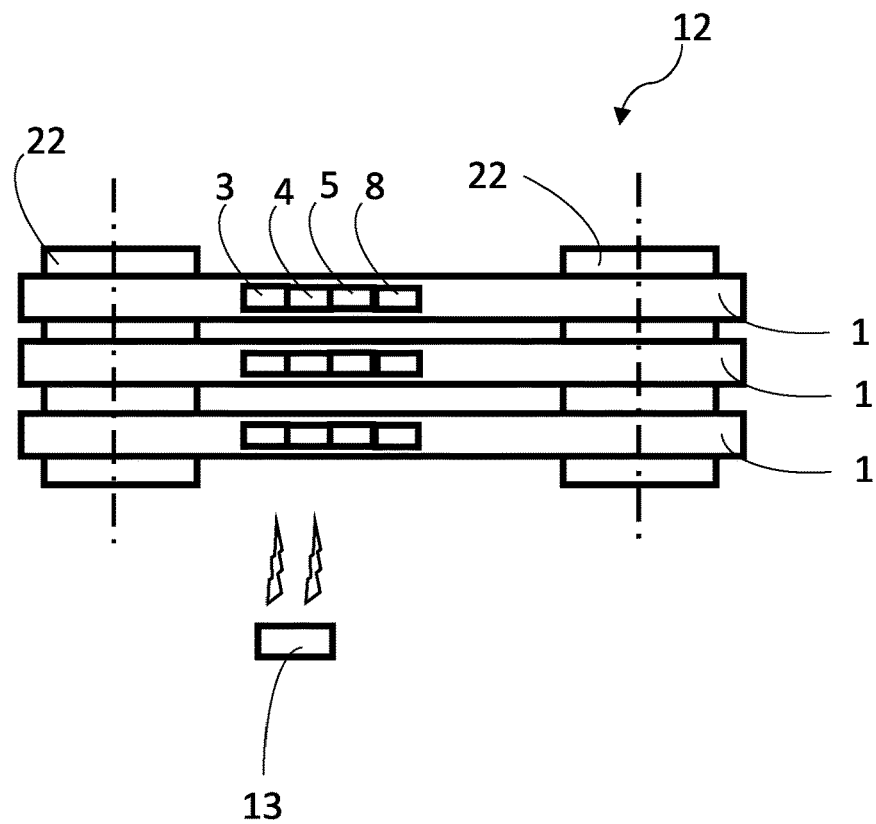
FIG. 7 is a schematic view of a condition monitoring arrangement according to another embodiment of the present disclosure.

FIG. 7 depicts a schematic view of a condition monitoring arrangement 12 according to an embodiment of the present disclosure. The condition monitoring arrangement 12 for monitoring a state of a transmission belt 1 comprises a transmission belt 1 according to any one of the embodiments as presented in the present disclosure. Here, a multi-belt application can be seen comprising a plurality of transmission belts 1 according to an embodiment of the present disclosure running over two pulleys 22. One of the pulleys may be a drive pulley connected to an engine or motor, and the other pulley may be a driven pulley connected to a vehicle or machinery. The arrangement 12 is further seen comprising at least one receiver 13 for receiving a signal transmitted from the transmission belt 1.

Figure 8:
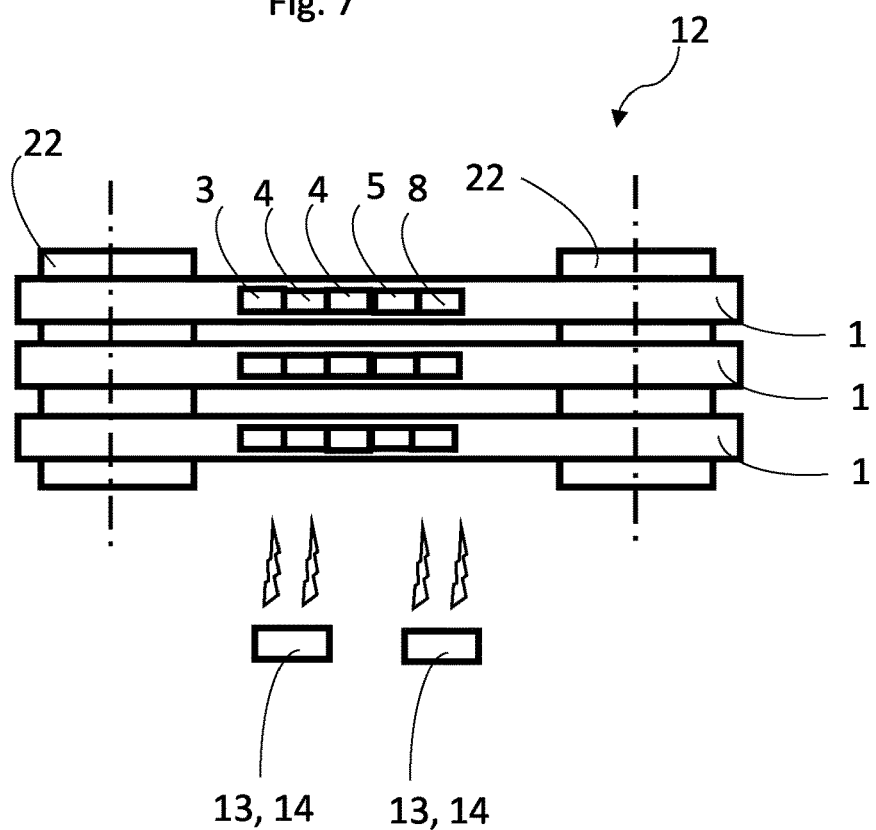
FIG. 8 is a schematic view of a condition monitoring arrangement according to another embodiment of the present disclosure.

FIG. 8 depicts a schematic view of a condition monitoring arrangement 12 according to an embodiment of the present disclosure. Here, a multi-belt application can be seen, similar to FIG. 7, here comprising the condition monitoring arrangement 12 of FIG. 6.

Figure 9:
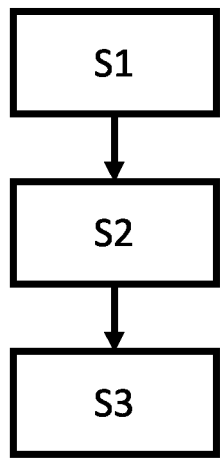
FIG. 9 is a flowchart of a method according to an embodiment of the present disclosure.

FIG. 9 depicts a flowchart of a method according to an embodiment of the present disclosure.

The method is a method for providing S1 electrical power to at least one sensor and/or transmitter for issuing S3 a signal indicative of the state of a transmission belt 1. The belt 1 (see e.g. FIG. 1A) comprises a belt member 2, at least one sensor 3 for measuring a parameter indicative of a state of the transmission belt 1, a transmitter 4 for transmitting a signal indicative of the state of the transmission belt 1, and a power system 5 for providing electrical power to the at least one sensor 3 and/or the transmitter 4. The at least one sensor 3, the transmitter 4 and the power system 5 are attached to the belt member 2. The power system 5 comprises a power source 6 and an energy converter 7. The energy converter 7 is configured to receive energy, convert the received energy to electrical energy and feed the electrical energy to the power source 6. The method comprises providing S1, from the power system 5, electrical power to the at least one sensor 3 and/or transmitter 4, determining S2 the state of the transmission belt on the basis of a parameter measured by the at least one sensor 3, and issuing S3 the signal indicative of the state of the transmission belt 1.

Figure 10:
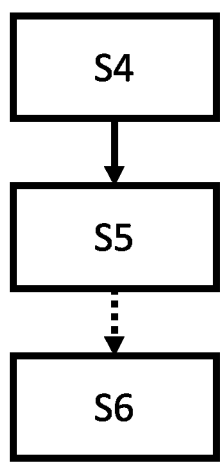
FIG. 10 is a flowchart of a method according to another embodiment of the present disclosure.

FIG. 10 depicts a flowchart of a method according to an embodiment of the present disclosure. The method is a method for condition monitoring of a transmission belt 1 issuing S3 a signal as described in FIG. 9. The method comprises receiving S4 the signal by using a receiver 13 (not shown) and comparing S5 the signal with a predetermined first criterion. By comparing the signal with a predetermined first criterion, a state of the transmission belt 1 can be determined. For instance, a state of elongation of the transmission belt 1 may be determined.

The flowchart of the method can be seen comprising a further optional step of issuing S6 a notification if the signal is outside a predetermined second criterion. This way, the situation can be analyzed in order to take suitable actions to maintain an efficient operation of the machinery, such as planning for servicing or replacing the transmission belt 1.

Figure 11:
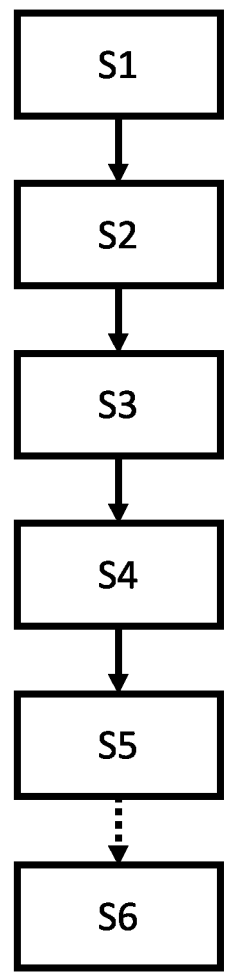
FIG. 11 is a flowchart of a method according to another embodiment of the present disclosure.

FIG. 11 depicts a flowchart of a method according to an embodiment of the present disclosure. Here, a combination of the methods for issuing a signal as shown in FIG. 9 and for condition monitoring of a transmission belt 1 as shown in FIG. 10 can be seen.

It is to be understood that the present invention is not limited to the embodiments described above and illustrated in the drawings; rather, the skilled person will recognize that many changes and modifications may be made within the scope of the appended claims.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide transmission belts.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A method for providing electrical power to one or more sensors and/or a transmitter for issuing a signal indicative of a state of a transmission belt, the transmission belt comprising:
   a belt member,
   at least one sensor mounted in or on the belt member for measuring a parameter indicative of a state of the transmission belt, the at least one sensor including an antenna, and the parameter indicative of the state of the transmission belt being a current deflection of the antenna,
   a transmitter mounted in or on the belt member for transmitting a signal indicative of the state of the transmission belt, and
   a power system mounted in or on the belt member for providing electrical power to the at least one sensor and/or the transmitter, the power system comprising a power source and an energy converter, wherein the energy converter is configured to produce an electric current from kinetic energy of the belt and supply the electric current to the power source,
   the method comprising:
   driving the transmission belt,
   using the energy converter to produce the electric current from the kinetic energy of the driven transmission belt,
   providing the electric current from the power system to the at least one sensor and/or transmitter,
   determining the state of the transmission belt from the parameter, and
   issuing the signal indicative of the state of the transmission belt.

2. A method for condition monitoring of a transmission belt by issuing a signal according to claim 1, the method comprising:
   receiving the signal by using a receiver,
   comparing the signal with a predetermined first criterion.

3. The method according to claim 2, further comprising:
   issuing a notification if the signal fulfils the predetermined first criterion.

4. A transmission belt, comprising:
   a belt member,
   at least one sensor attached to the belt member and configured to measure a parameter indicative of a state of the transmission belt,
   a transmitter attached to the belt member and configured to transmit a signal indicative of the state of the transmission belt to a receiver, and
   a power system configured to provide power to the at least one sensor and/or the transmitter,
   wherein the power system includes an electrical storage device electrically connected to an energy converter,
   wherein the energy converter is configured to produce an electric current from kinetic energy of the belt member,
   wherein the at least one sensor includes an antenna, and
   wherein the parameter indicative of the state of the transmission belt is a current deflection of the antenna.

5. The transmission belt according to any claim 4,
   wherein the state is a degree of elongation of the transmission belt.

6. The transmission belt according to claim 4,
   wherein the at least one sensor is configured to communicate the measured parameter indicative of the state of the transmission belt to the transmitter.

7. A condition monitoring system for monitoring a state of a transmission belt, the system comprising:
   a transmission belt according to claim 4, and
   at least one receiver for receiving the signal transmitted from the transmitter.

8. The transmission belt according to claim 4,
   wherein the electrical storage device and the energy converter are mounted on or in the belt member.

9. The transmission belt according to any claim 8,
   wherein the state is a degree of elongation of the transmission belt.

10. The transmission belt according to claim 9,
    wherein the at least one sensor is configured to communicate the measured parameter indicative of the state of the transmission belt to the transmitter.

11. A condition monitoring system for monitoring a state of a transmission belt, the system comprising:
    a transmission belt according to claim 10, and
    at least one receiver for receiving the signal transmitted from the transmitter.

* * * * *